331-84 Examiner

Feb. 10, 1948. E. G. LINDER Re. 22,974

Orig. 2276,3

ELECTRON BEAM DISCHARGE DEVICE SYSTEM WITH RESONANT ELECTRODE

Filed Nov. 6, 1943

Inventor

Ernest G. Linder

By C. D. Puska

Attorney

Examiner

Reissued Feb. 10, 1948

Re. 22,974

UNITED STATES PATENT OFFICE 22,974

ELECTRON BEAM DISCHARGE DEVICE SYSTEM WITH RESONANT ELECTRODE

Ernest G. Linder, Princeton, N. J., assignor to Radio Corporation of America, a corporation of Delaware Original No. 2,276,320, dated March 17, 1942, Serial No. 281,927, June 29, 1939. Application for reissue November 6, 1943, Serial No. 509,340

16 Claims. (Cl. 250—36)

This invention relates to centimeter wave devices of the electronic beam type and especially to electronic devices in which a control electrode is used as an oscillatory circuit.

The electrons in a beam move with finite velocity from their point of emission toward a target or collecting electrode. The electronic beam may be focused by control electrodes suitably arranged and biased. The electron velocity may be regulated by the bias applied to the control and target electrodes.

If the control electrode is made hollow, the velocity of the electrons may be chosen so that the time of transit through the hollow electrode is a function of the natural period of the electrode as an oscillatory circuit. The electrons entering and leaving the hollow electrode will set up a transient in the electrode and, as a result, oscillatory currents will flow in the electrode. The field created by the oscillations will subtract energy from some of the electrons entering and leaving the hollow control electrode, thereby sustaining the oscillations. Since the hollow electrode has the properties of a Faraday cage, the oscillatory fields will exist in the regions external to the cylinder and electrons within the cylinder will not be influenced. Such device may be used for generating or receiving oscillations.

One of the objects of the invention is to provide means for generating centimeter waves. Another object is to provide means for receiving centimeter waves. Another object is to provide means for utilizing the beam effect of electrons to generate ultra high frequency oscillations in a resonant electrode controlling the beam. Another object is to provide means for utilizing the beam effect of electrons so that a resonant electrode controlling the beam also modulates the beam to thereby receive centimeter waves.

Figure 1:
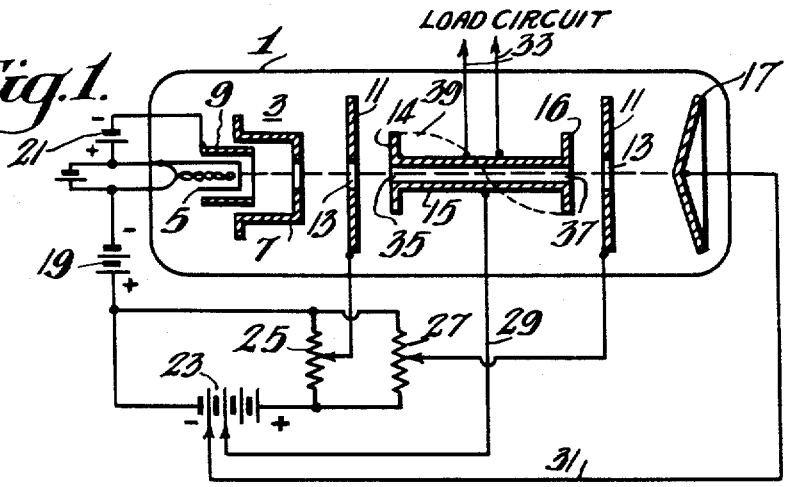
Figure 2:
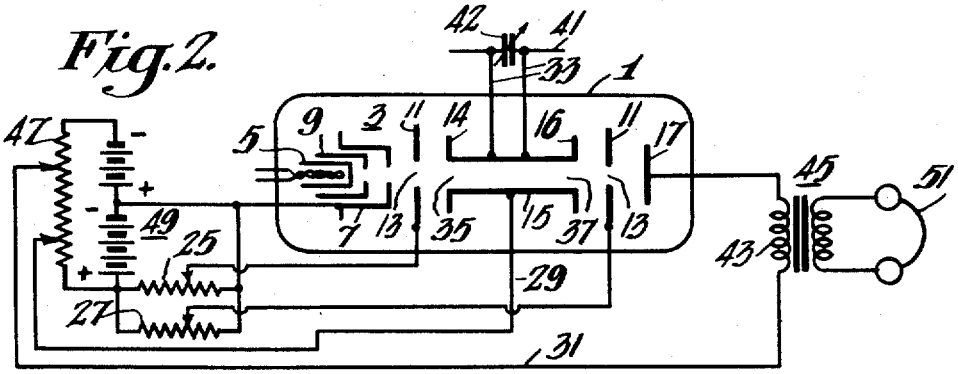
Figure 3:
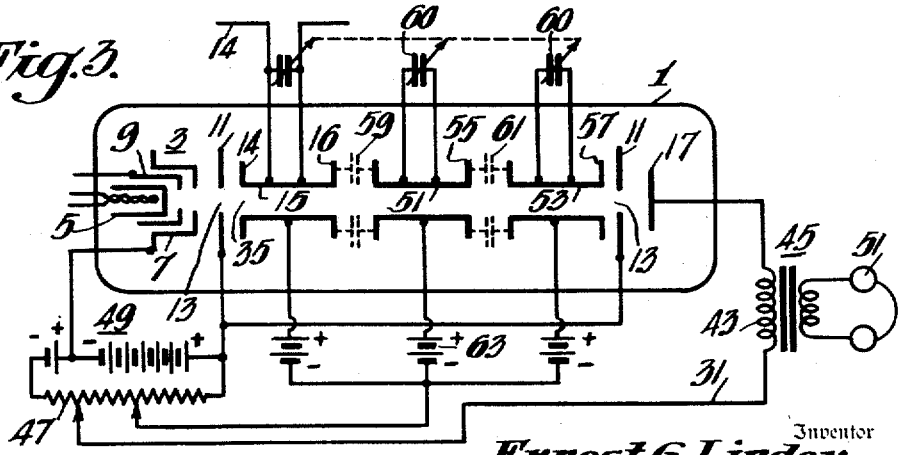

The invention will be described by referring to the accompanying drawing, in which Figure 1 is a schematic diagram of a centimeter wave generator embodying the invention; and Figures 2 and 3 are circuit diagrams of embodiments of the invention in a receiving device. Similar reference numerals will be used to indicate similar elements in the several figures.

Referring to Fig. 1, within an evacuated envelope 1 the following elements are coaxially arranged: an electron gun 3 including a cathode 5, an anode 7 and a control electrode 9, diaphragms 11 including apertures 13, flanges 14 and 16, a hollow resonant control electrode 15, and an anode or target electrode 17. The electron gun is energized by batteries 19, 21 and is connected to the negative terminal of a biasing battery 23. Potentiometers 25, 27 are shunted across the battery 23. The adjustable contacts of the potentiometers are connected to the diaphragms 11. The hollow resonant control electrode is connected by a lead 29 to a positive point intermediate the ends of the battery 23. The lead 29 is preferably connected to the resonant electrode at a potential node. The target electrode 17 is biased positively by a connection 31 to the battery 23. The load or output circuit (not shown) is connected to the resonant electrode by a transmission line 33, which may be matched to a proper impedance portion of the resonant electrode. The flanges 14, 16 are used so that physical length of the resonant electrode may be slightly less than a half wave, which is substantially the electrical length of the electrode.

In the operation of the generator, the electron transit time is adjusted by varying the several bias potentials until the electrons entering the resonant electrode during a negative half cycle of the front end 35, leave during a positive half cycle of the rear end 37. These electrons are decelerated and deliver energy to the oscillatory circuit. The electrons entering the resonant electrode during a positive half cycle of the front end 35 also leave during a positive half cycle of the rear end 37. These electrons at the front end are accelerated and abstract energy from the oscillatory circuit, but are decelerated at the rear end and therefore deliver energy to the oscillatory circuit. It follows that the decelerated electrons will yield more energy than the accelerated electrons take up because the resonant period, and hence phases of the potentials of the resonant electrode, may be made an optimum for the purpose of taking energy from the electrons, and such period will not result in potentials of a phase which deliver as much energy to the accelerated electrons as is abstrated from the decelerated electrons.

It should be understood that the bias potentials applied to the apertured diaphragm electrodes and the spacing of these electrodes from the front and rear ends, respectively, of the hollow electrode are so adjusted that the electron transit time between the diaphragm electrode and the hollow electrode is of the order of a half period of the operating frequency.

Thus, after a transient effect starts oscillatory currents, some of the electrons entering and leaving the resonant electrode sustain the oscillations. The sustenance of the oscillations is a function of the effective length of the resonant electrode, the transit times of the electrons in the gaps at either end of the resonant electrode, and the period of dwell of the electrons within the hollow electrode. The voltage distribution of the oscillations is represented by the dash line 39. This voltage distribution indicates that the currents in the resonant control electrode are oscillating at the resonant periods of the electrode and distinguishes the operation from oscillators of the Heil type (see British Patent 431,447), in which the control or hollow electrode "oscillates electrically as a whole."

In Fig. 2, the receiving antenna 41 is connected to the resonant electrode 15. The effective length of the resonant electrode may be varied by a capacitor 42 connected across the transmission line 33 coupling the antenna to the resonant electrode 15. The target 17 is connected through the primary 43 of an output transformer 45 to a potentiometer 47. The potentiometer is energized by a battery 49 which is connected so that the target bias may be made negative or positive with respect to the electron gun 3. The remaining electrodes are biased by connections similar to those previously described. The output of the receiver may be applied directly to telephone receivers 51 or further amplified before being applied to a signal indicating device.

In the operation of the receiving device, the several biasing potentials are adjusted so that, for a no signal condition, the electron beam just reaches the target 17. This condition may require even a slightly negative bias. When the proper condition is reached, some of the electrons will just reach the target and other electrons will fail to reach that electrode. The incoming signal currents will be resonated by the resonant control electrode. The control electrode on one half cycle will accelerate some of the electrons and thus increase the number of electrons reaching the target. On the next half cycle the control electrode will decelerate the electrons and thus prevent any electrons from reaching the target. Thus, the electron beam is modulated and the received signals detected.

If amplification is desired, the receiver may be provided with several resonant control electrodes 15, 51, 53. The additional electrodes 51, 53 are provided with flanges 55, 57, respectively. The flanges form capacitors 59, 61, which couple the resonant electrodes. The effective lengths of the resonant electrodes may be varied by means of capacitors 60 connected to the resonant electrodes by transmission lines 62. The several electrodes may be biased by appropriate connections 63 to the battery 49. The connections are made at a potential node so that the oscillatory current distribution is not altered by the bias connections. It should be understood that separate connections may be used to bias the electrodes to different potentials, as is well known to those skilled in the art.

Thus the invention has been described as a centimeter wave device in which the electrons are beamed and passed through a hollow resonant electrode. The electron transit times are so arranged that energy may be abstracted from the electrons to create and sustain oscillatory currents in the resonant electrode. In a somewhat similar manner, the device may be used as a receiver and in that case, the oscillatory currents applied to the resonant electrode. Instead of passing the beam through the hollow electrode to a target where some of the electrons of the beam are absorbed or deflected, the target may be biased to return the electrons to the hollow electrode and thus permit further oscillations to be generated in the manner of a Barkhausen-Kurz oscillator. This may be best accomplished by employing a target electrode which will refocus the electrons or by secondary emission from the target, in which case the target is biased to increase the secondary emission.

I claim as my invention:

1. An electronic device including a source of electrons, means for beaming said electrons, a hollow resonant electrode for shielding electrons within said hollow from external fields, said electrode having such length that it resonates at the operating frequency, means for directing said beam through said hollow electrode along its longitudinal axis, means for applying a biasing potential to said electrode, and means for adjusting independently the velocity of said electrons entering and leaving said hollow electrode so that the distribution of oscillatory potentials along the length of said electrode alter the energy of said electrons passing therethrough.

2. A centimeter wave device including a source of electrons, means for beaming said electrons, a hollow electrode, said electrode including flanges at its open ends and within which hollow electrons are shielded from external fields, a target, means for directing said beam through said hollow electrode along its longitudinal axis and toward said target, and means for controlling the velocity of said electrons so that some of the electrons entering and leaving said hollow electrode deliver energy thereto to create and sustain oscillatory currents within said electrode at its resonant frequency.

3. A centimeter wave device including a source of electrons, means for beaming said electrons, a hollow electrode of less than a half wave length, flanges mounted adjacent the ends of said electrode to make its effective length substantially a half wave and its space within said flanges shielding electrons passing therethrough from external fields, means for directing said beam of electrons through said hollow electrode along its longitudinal axis, and means for controlling the velocity of the electrons of said beam so that some of the electrons approaching said electrode and some of the electrons leaving said electrode deliver energy to said electrode to sustain oscillatory currents therein.

4. A centimeter wave receiving device including a source of electrons, means for beaming said electrons, a hollow resonant electrode for shielding electrons passing therethrough from external fields, a transmission line connected to said electrode for conveying thereto currents to be resonated and detected, means for directing said beam through said hollow electrode along its longitudinal axis, a target electrode, means for adjusting the velocity of the electrons of said beam so that some of the electrons passing through said hollow electrode just reach said target electrode, and an output device connected to said target so that changes in the number of electrons reaching the target may be indicated.

5. In a device of the character of claim 4, an additional hollow resonant electrode arranged to pass along its longitudinal axis said beam and coupled to said first named resonant electrode.

6. A device of the character of claim 4 in which the resonant electrode includes flanges forming capacity areas which diminish the physical length of the resonant electrode and in which the effective length of the resonant electrode equals sub- Examiner stantially a half wave length of the currents to be detected.

7. A device of the character of claim 4 including a capacitor effectively connected to said resonant electrode for varying the effective length of the resonant electrode.

8. In a device of the character of claim 1, an apertured diaphragm electrode adjacent the hollow end of said resonant electrode, and means for applying a second positive biasing potential to said diaphragm electrode for adjusting the electron transit time between said last two electrodes.

9. In a device of the character of claim 1, a pair of apertured diaphragm electrodes located at the opposite ends of said resonant electrode, and means for applying additional separate positive biasing potentials to each of said diaphragm electrodes for adjusting the electron transit times between said diaphragm electrodes and said hollow electrode ends.

10. In a device of the character of claim 2, an apertured diaphragm electrode adjacent the hollow end of said resonant electrode, and means for adjusting the electron transit time between said last two electrodes.

11. In a deviee of the character of claim 2, a pair of apertured diaphragm electrodes located at the opposite ends of said resonant electrode, and means for adjusting the electron transit times between said diaphragm electrodes and said hollow electrode ends.

12. In a device of the character of claim 4, an additional hollow resonant electrode arranged to pass along its longitudinal axis said beam and coupled to said first named resonant electrode, and means for including a biasing potential applied to said additional electrode for adjusting the electron transit time through said coupling.

13. In a device of the character of claim 4, an additional hollow resonant electrode arranged to pass along its longitudinal axis said beam and coupled to said first named resonant electrode, and apertured diaphragm electrodes positioned respectively at the entrance end of said first named hollow resonant electrode and the exit end of said additional electrode.

14. In a device of the character of claim 4, an apertured diaphragm electrode adjacent the hollow end of said resonant electrode, and means including a biasing potential applied to said additional electrode for adjusting the electron transit time between said hollow end and said apertured diaphragm electrode.

15. In a device of the character of claim 4, an additional hollow resonant electrode arranged to pass along its longitudinal axis said beam and coupled to said first named resonant electrode, apertured diaphragm electrodes positioned respectively at the entrance end of said first named hollow resonant electrode and the exit end of said additional electrode, and means for biasing separately said resonant electrodes and said diaphragm electrodes.

16. An electronic device including an electronic gun, means for beaming the electrons from said gun, a hollow resonant electrode for shielding electrons projected from external fields, said resonant electrode having an effective length equal to an integral number of half wave lengths of the oscillatory currents established thereon, means for directing said beam of electrons through said hollow electrode along its longitudinal axis, and means for adjusting independently the velocity of said electrons entering and leaving said hollow electrode so that the distribution of oscillatory potentials along the length of said electrode alter the energy of said electrons.

ERNEST G. LINDER.

REFERENCES CITED

The following references are of record in the file of this patent:

UNITED STATES PATENTS

| Number | Name | Date |
|---|---|---|
| 2,190,668 | Llewellyn | Feb. 20, 1940 |